United States Patent [19]

Bristol

[11] Patent Number: 4,573,777
[45] Date of Patent: Mar. 4, 1986

[54] ASPHERIC SPECTACLE LENS BLANK

[76] Inventor: Alexander C. Bristol, 5480 SW. 85 St., Miami, Fla. 33143

[21] Appl. No.: 587,678

[22] Filed: Mar. 8, 1984

[51] Int. Cl.[4] ............................ G02C 7/02; G02C 7/06
[52] U.S. Cl. .................................... 351/167; 351/168; 351/177
[58] Field of Search ........................ 351/167, 168-172, 351/177

[56] References Cited

U.S. PATENT DOCUMENTS

| | | | |
|---|---|---|---|
| 2,518,099 | 8/1950 | Tillyer | 351/167 |
| 2,796,000 | 6/1957 | Beasley | 351/167 X |
| 2,923,201 | 2/1960 | Beasley | 351/167 |
| 3,169,247 | 2/1965 | Davis et al. | 351/167 |
| 3,781,097 | 12/1973 | Bechtold | 351/167 |
| 3,950,082 | 4/1976 | Volk | 351/167 |
| 4,073,578 | 2/1978 | Welsh | 351/167 |
| 4,181,409 | 1/1980 | Whitney et al. | 351/167 |
| 4,185,897 | 1/1980 | Frieder | 351/167 |

FOREIGN PATENT DOCUMENTS

| | | | |
|---|---|---|---|
| 972730 | 9/1950 | France | 351/168 |
| 520764 | 5/1940 | United Kingdom | 351/168 |

OTHER PUBLICATIONS

Tillyer Topics; American Optical advert.; *Optometric Weekly*; Nov. 9, 1972; p. 5.
Armorlite advert., "Flat Top Aspheric Lenticular"; American Journal of Ophthalmology; vol. 64, No. 6; Dec. 1967, p. 57.

*Primary Examiner*—John K. Corbin
*Assistant Examiner*—Scott J. Sugarman
*Attorney, Agent, or Firm*—Gifford, Groh, VanOphem, Sheridan, Sprinkle & Dolgorukov

[57] ABSTRACT

The present invention provides a spectacle lens blank for an aphakic eye and which is adapted to be worn in front of the eye by patients following extra capsular surgery. The lens blank includes a lens body having a posterior surface and an aspherical anterior surface in which the lens power decreases from the center and towards the edges of the lens blank. The lens blank also includes a flat top bifocal lens segment having an optical center on the same vertical center line as the lens body but in which the flat top is spaced downwardly from the optical center of the lens body by one to four millimeters and preferably by substantially 3 millimeters. In use, the lens blank can be trimmed to fit eyeglass frames to produce either a left lens or right lens.

4 Claims, 3 Drawing Figures

ASPHERIC SPECTACLE LENS BLANK

BACKGROUND OF THE INVENTION

I. Field of the Invention

The present invention relates to an aspheric spectacle lens blank having a flat top bifocal lens aligned with the vertical center line of the lens blank but spaced below the horizontal center line of the lens blank.

II. Description of the Prior Art

There are many types of previously known lens blanks particularly designed for aphakia patients, i.e. patients following extra capsular surgery. Many of these previously known lens blanks are substantially circular in shape and include an aspherical anterior surface with a gradient which decreases the power of the lens from the central area and toward the outer periphery of the lens. Prior to actual use by the patient, the outer periphery of the lens is trimmed to fit spectacle frames.

When these previously known lenses also include a bifocal segment, the bifocal segment is typically decentered from the geometric center of the lens blank, i.e., the bifocal portion is spaced both below the horizontal axis of the lens blank and is also horizontally spaced from the vertical centerline of the lens blank by a predetermined distance. This horizontal spacing from the vertical centerline of the lens blank is in one direction for a right lens and, conversely, in the other direction for a left lens. Consequently, after the lens blank is trimmed to fit the spectacle frames, the bifocal segments are positioned closer to the patient's nose in the well known fashion.

This previously known practice of manufacturing separate right and left lens blanks for lenses containing bifocal portions is disadvantageous in that it essentially doubles the amount of inventory of semi-finished lens blanks which must be maintained in inventory by the laboratory prior to trimming the blank to its final shape. In other words, for every left lens containing a bifocal segment, a right lens must also be maintained in inventory. Furthermore, in the event that one lens becomes scratched or flawed in any other fashion, the matching unflawed lens constitutes a wasted inventory cost, at least until the flawed lens can be replaced.

SUMMARY OF THE PRESENT INVENTION

The present invention provides a spectacle for aphakia patients with a bifocal segment which overcomes the previously known disadvantages of the prior art.

In brief, the lens blank of the present invention is generally circular in shape and comprises a posterior surface and an aspheric anterior surface. In the well known fashion, the power of the lens decreases from the center of the anterior surface and towards the outer periphery of the lens blank.

The lens blank further includes a flat top bifocal segment. Unlike the prior art, however, the optical center of the bifocal segment is vertically aligned with the optical center of the lens blank while the flat top of the bifocal segment is positioned below the horizontal centerline by one to four millimeters, and preferably by substantially three millimeters.

In order to form a right spectacle lens from the lens blank with the bifocal segment of the present invention, a greater amount of the lens is trimmed from one side than the other thus effectively moving the geometric center of the bifocal segment to one side of the finished spectacle lens as desired. Conversely, to form a left lens, a greater amount of the spectacle lens is trimmed from the other side thus effectively shifting the bifocal segment horizontally in the opposite direction as described.

Since the lens blank of the present invention can be trimmed to either a right or left spectacle lens, the lens blank of the present invention substantially reduces the necessary inventory for the laboratory thus resulting in an overall economic savings.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which.

DETAILED DESCRIPTION OF A PREFERRED EMBODIMENT OF THE INVENTION

Figure 1:
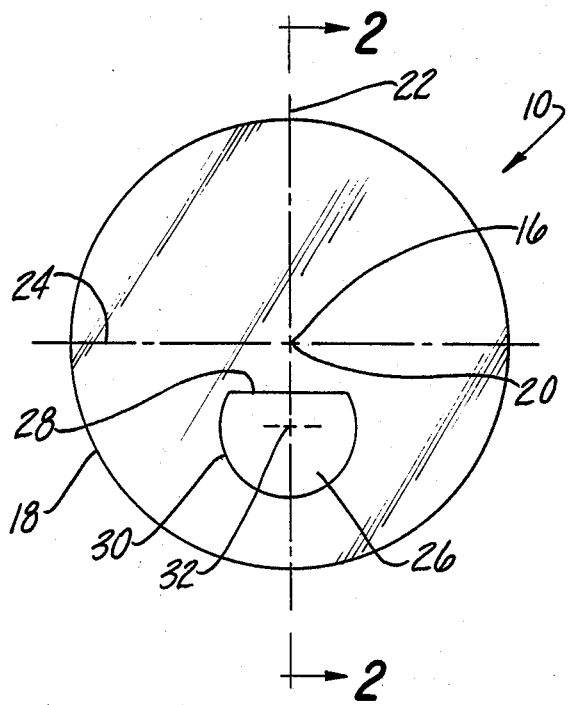
FIG. 1 is a front view illustrating a preferred embodiment of the lens blank of the present invention.
Figure 2:
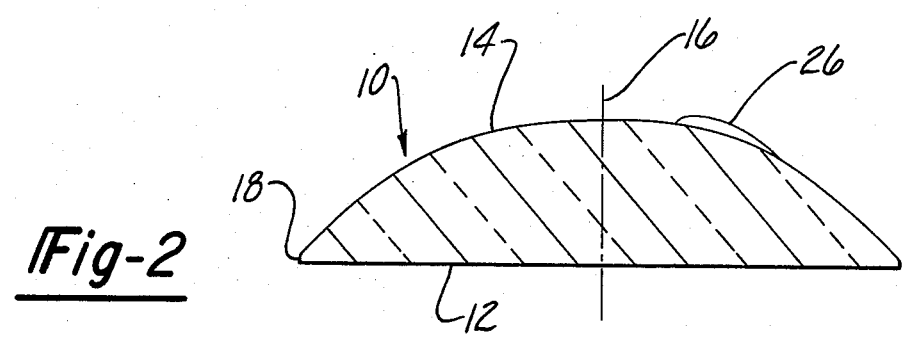
FIG. 2 is a sectional view taken substantially along line 2—2 in FIG. 1.

With reference first to FIGS. 1 and 2, a preferred embodiment of the lens blank for aphakia patients is thereshown and comprises a lens body 10 constructed of a transparent material. Typically, the lens body 10 is molded from transparent plastic or glass.

The lens body 10 includes a posterior surface 12 and a curvilinear anterior surface 14. As best shown in FIG. 2, the anterior surface 14 is aspherical to that the lens power decreases from the center 16 of the lens and towards its outer periphery 18.

As best shown in FIG. 1, the lens body 10 includes a geometric and optical center 20 while its outer periphery 18 is generally circular in shape. This optical center 20 coincides with both the vertical centerline 22 and horizontal centerline 24 of the lens blank 10.

As best shown in FIG. 1, the lens blank of the present invention further comprises a bifocal segment 26 in addition to the aspherical lens body 10. This bifocal segment 26 includes a flat top 28 and a curvilinear side and bottom periphery 30. The flat top 28 is generally parallel to the horizontal centerline 24 of the lens body 10.

Still referring to FIG. 1, unlike the previously known lens blanks for aphakia patients, the optical center 32 of the bifocal segment 26 is aligned with the vertical centerline 22 of the lens body 10 but is spaced downwardly from the horizontal centerline 24. Preferably, the distance between the bifocal segment flat top 28 and the horizontal 24 is one to four millimeters and optimally about 3 millimeters. Consequently, the optical center 32 of the bifocal segment 26 is spaced downwardly from the lens body optical center 20 by about 7 to 12 millimeters.

Figure 3:
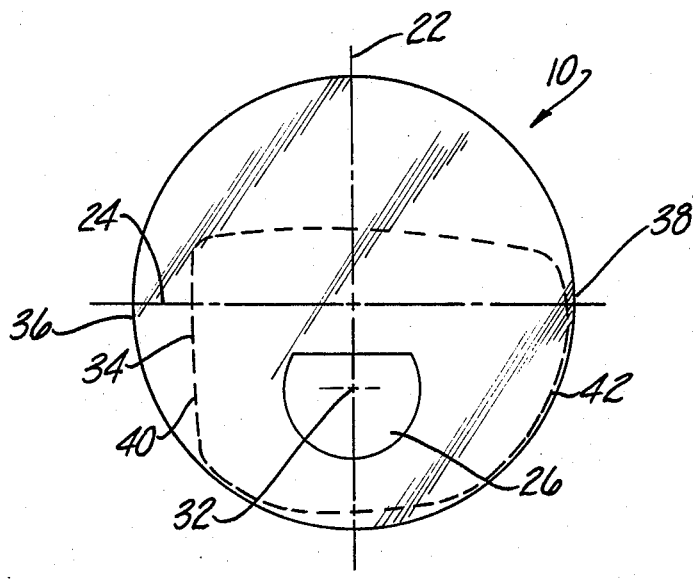
FIG. 3 is a view similar to FIG. 1 but illustrating a method of trimming the lens blank to form a right or left spectacle lens.

With reference now particularly to FIG. 3, in order to form a left finished spectacle lens from the lens body 10, the lens body 10 is trimmed as shown by phantom line 34 so that a greater amount of the lens body 10 is trimmed from one side 36 than the other side 38. Consequently, in the finished spectacle lens the bifocal segment 26 is decentered as desired, i.e. spaced downwardly from the geometric center of the finished spectacle lens and is horizontally positioned closer to one side 40 of the finished spectacle lens than the other side 42. In order to form a right spectacle lens, this process is reversed so that a greater amount of the lens body 10 is trimmed from its side 38 than the side 36 thus producing a mirror image of the finished spectacle lens shown by phantom line 34 in FIG. 3.

From the foregoing, it can be seen that the present invention provides an aspherical lens body for aphakia patients having a flat top bifocal segment and which can be ultimately used as either a right or left spectacle. As such, the present invention greatly reduces the amount of inventory which must be maintained on hand by laboratories and the like.

Having described my invention, however, many modifications thereto will become apparent to those skilled in the art to which it pertains without deviation from the spirit of the invention as defined by the scope of the appended claims.

I claim:

1. A lens for either a left or right aphakic eye comprising:
    a lens body having a posterior surface and an aspheric anterior surface, said lens body having a vertical centerline and a horizontal centerline which intersect at an optical center of the lens body,
    a bifocal segment having a flat top and an optical center, said bifocal segment optical center being substantially aligned with said vertical centerline but spaced downwardly from said horizontal centerline so that said flat top is substantially parallel to but spaced downwardly from said horizontal centerline by a predetermined distance, and
    wherein the lens for either the left or right eye is formed by trimming said lens body so that said bifocal segment is nasally decentered.

2. The invention as defined in claim 1 wherein said predetermined distance is in the range of one to four millimeters.

3. The invention as defined in claim 2 wherein said predetermined distance is substantially three millimeters.

4. A method for forming a left or right spectacle lens for an aphakic eye comprising the steps of forming a lens blank with a body having a posterior surface and an aspheric anterior surface, said lens body having a vertical center line and a horizontal center line which intersect at an optical center of the lens body,
    said blank having a bifocal segment having a flat top and an optical center, said bifocal segment optical center being substantially aligned with said vertical centerline but spaced downwardly from said horizontal centerline so that said flat top is substantially parallel to but spaced downwardly from said horizontal centerline by a predetermined distance, and
    trimming said lens blank for either a left or right spectacle lens so that said bifocal segment is nasally decentered.

* * * * *